US011226794B2

(12) United States Patent
Ritter et al.

(10) Patent No.: US 11,226,794 B2
(45) Date of Patent: *Jan. 18, 2022

(54) RELATIONAL LOGIC INTEGRATION

(71) Applicant: SAP SE, Walldorf (DE)

(72) Inventors: Daniel Ritter, Heidelberg (DE); Jan Bross, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,600

(22) Filed: Dec. 30, 2019

(65) Prior Publication Data

US 2020/0341738 A1    Oct. 29, 2020

Related U.S. Application Data

(63) Continuation of application No. 14/335,502, filed on Jul. 18, 2014, now Pat. No. 10,564,937.

(51) Int. Cl.
| | | |
|---|---|---|
| *G06F 8/30* | (2018.01) | |
| *G06F 8/70* | (2018.01) | |
| *G06F 8/20* | (2018.01) | |
| *G06F 9/54* | (2006.01) | |
| *G06F 16/25* | (2019.01) | |

(52) U.S. Cl.
CPC ............... *G06F 8/313* (2013.01); *G06F 8/20* (2013.01); *G06F 8/70* (2013.01); *G06F 9/541* (2013.01); *G06F 16/25* (2019.01)

(58) Field of Classification Search
CPC ... G06F 8/313; G06F 8/20; G06F 8/70; G06F 9/541; G06F 16/25

USPC .......................................................... 717/114
See application file for complete search history.

(56) References Cited

U.S. PATENT DOCUMENTS

| | | | |
|---|---|---|---|
| 8,543,653 | B2 | 9/2013 | Bhatt et al. |
| 8,655,989 | B2 | 2/2014 | Ritter et al. |
| 8,661,107 | B2 | 2/2014 | Hoffmann et al. |
| 8,739,124 | B2 | 5/2014 | Ritter et al. |
| 9,098,292 | B1 * | 8/2015 | Zhang ...................... G06F 8/30 |

(Continued)

OTHER PUBLICATIONS

Ritter et al., "Datalog Pipelines: Relational Logic Integration Programs" 25th International Conference, DEXA 2014, Munich, Germany, Sep. 1-4, 2014, 8 pages.

(Continued)

*Primary Examiner* — Chat C Do
*Assistant Examiner* — Bradford F Wheaton
(74) *Attorney, Agent, or Firm* — Fish & Richardson P.C.

(57) ABSTRACT

The present disclosure describes methods, systems, and computer program products for performing integration logic programming. One computer-implemented method includes receiving, by operation of a middleware system, first information in a first format corresponding to a first application, applying, by operation of the middleware system, one or more integration logic programming (ILP) patterns to the first information, the one or more ILP patterns representing application integration semantics using a logic programming language, generating, by operation of the middleware system, a second information in response to applying the one or more ILP patterns to the first information, and outputting, by operation of the middleware system, the second information in a second format corresponding to a second application.

17 Claims, 12 Drawing Sheets

(56) References Cited

U.S. PATENT DOCUMENTS

| | | |
|---|---|---|
| 9,135,604 B2 | 9/2015 | Ritter et al. |
| 9,411,845 B2 | 8/2016 | Mathis et al. |
| 2006/0184473 A1* | 8/2006 | Eder ............... G06N 5/022 706/20 |
| 2008/0127127 A1 | 5/2008 | Chitgupakar et al. |
| 2010/0312737 A1 | 12/2010 | Coldicott et al. |
| 2012/0089534 A1 | 4/2012 | Liebig et al. |
| 2012/0185821 A1* | 7/2012 | Yaseen ............... G06F 8/35 717/105 |
| 2013/0144591 A1* | 6/2013 | Khan ............... G06F 30/20 703/22 |
| 2013/0151463 A1 | 6/2013 | Ritter et al. |
| 2013/0173719 A1 | 7/2013 | Ahmed et al. |
| 2013/0332240 A1* | 12/2013 | Patri ............... G06Q 10/06 705/7.36 |
| 2014/0372428 A1* | 12/2014 | Mathis ............... G06F 16/258 707/736 |
| 2014/0372488 A1 | 12/2014 | Ritter et al. |
| 2015/0149565 A1 | 5/2015 | Ahmed |
| 2016/0019032 A1 | 1/2016 | Ritter et al. |

OTHER PUBLICATIONS

Sosulski, "Exception Handling in Integration Systems based on the Business Process Model and Notation", Bachelor Thesis, Beden-Wuettemberg Cooperative State University, Mannheim, Germany, Dept. of Business Information Systems, Software Engineering; Feb. 10, 2014, 84 pages.

\* cited by examiner

```
                Listing 1. "Twitter daily trends using Datalog with choice"
1    from("twitter://trends/daily") .unmarshal(JSON > Datalog)
2        .choice () .when () .expression (DatalogPred(trends,
            =c(name, "DEXA")))
3            .marshal (Datalog > recv format) .to (<recv:a>)
4        .otherwise ()
5            .marshal (Datalog > recv format) .to (<recv:b>);
```

 

```
    Listing 2. "Twitter trends JSON"          Listing 3. "Corresponding Datalog Facts"
1   {                                          trends4 (name, events,
2   "name" : "Finally Friday",                     promoted, query).
3   "events" : null,                           meta ("trends4", "name",
4   "promoted" : null,                             "1").
5   "query" : "Finally Friday"                 meta ("trends4", "events",
6   }                                              "2"). ...
```

Listing 4. "Message Filter Pattern with Datalog"
```
1   from (direct : processing)
2      .filter () .expression (<predicate>) .to (<recv>);
```

Listing 5. "Content Filter Pattern with Datalog"
```
1   from (direct : processing)
2      .datalog (list (<rule>) [, <query>]) .to (<recv>);
```

Listing 6A. "Content-based Router Pattern with Datalog"
```
1   from (direct : processing)
2      .choice () .when () .expression (DatalogExp (<predicate+arity>
           [,<parameters>], <conditionexpression>)
3      .to (<recv:a>)
```

Listing 6B. "Content-based Router Pattern with Datalog"
```
1   from (direct : processing)
2      .choice () .when () .expression (<predicate>) .to (<recv:a>)
3      .otherwise () .to (<recv:b>);
```

FIG. 4

500

```
                    Listing 7A. "Splitter Pattern with Datalog"
1    from (direct : processing)
2        .split (datalog (<predicate+arity>))
3        .to (<recv>);
```

```
                    Listing 7B. "Splitter Pattern with Datalog"
1    from (direct : processing)
2        .split (list (<expression>)) .to (<recv>);
```

FIG. 5

600

```
                    Listing 8. "Aggregator Pattern with Datalog"
1    from (direct : processing)
2        .aggregate (<correlation condition>, <aggregation
                function>)
3        [.completionSize (<completion condition>) |
                completionTimeout (<completion condition>) ]
4        .to (<recv>);
```

FIG. 6

```
                  Listing 9. "Schematic rules for heat map computation"
1   position (Player ,X,Y,Time) :-
2           pos (Uid ,Y,X,Time,Pos2Id), pos (Pos2Id,PlayerId) ,
                player (PlayerId,Player , A, B,C,D).
3   position (Player ,X,Y,Time) :-
4           pos (Uid ,Y,X,Time,Pos2Id), pos (Pos2Id,PlayerId) ,
                traject (PlayerId,Player ,B,C,D).
5   position -qad-0-0 (Player ,X,Y,Time) :-
6           position  (Player ,X,Y,Time) , >(X, -525.0)
                <(X, -515.0) , >(Y, -340.0) , <(Y, -330.0)
```

FIG. 10

```
                  Listing 10. "Standard Datalog within the Datalog Pipeline"
1   from (" file : data -sequential")
2           .unmarshal (xml > datalog facts)
3           .process (new StartTimer () )
4           .datalog (${heatmap-rules})
5           .process (new EndTimer () )
```

FIG. 11

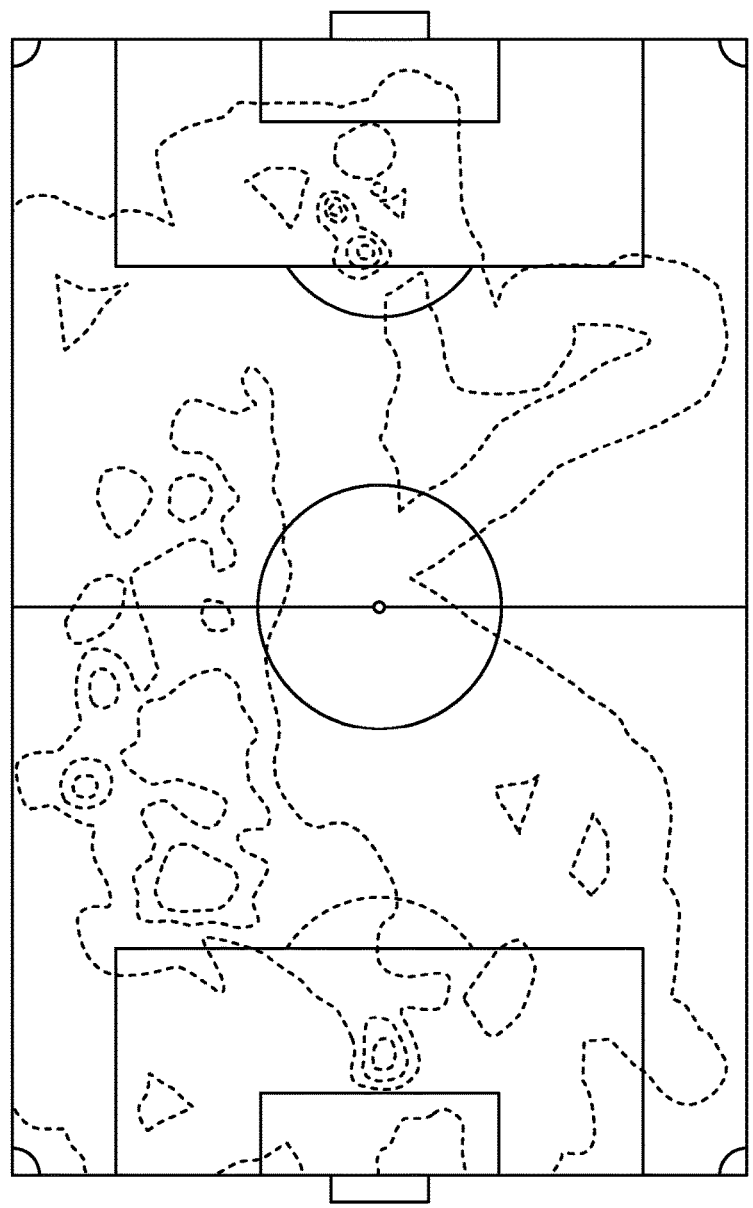
FIG. 12A

1300

```
                Listing 11. "Dialog Pipeline"
1    from (" file : data - parallel")
2            .split () .tokenizeXML ("PLAYER")
3                    .streaming () .parallelProcessing ()
4            .unmarshal (xml > datalog facts)
5            .process (new StartTimer () )
6            .datalog (${heatmap-rules})
7            .aggregate (constant (true),
                DatalogExp (union-rules) )
8                    .completionSize (<#PLAYER>)
9            .process (new EndTimer () )
```

RELATIONAL LOGIC INTEGRATION

BACKGROUND

Enterprise application integration is a process of linking multiple business applications (e.g., supply chain management applications, enterprise resource planning (ERP) systems, customer relationship management (CRM) applications, business intelligence applications, payroll and human resources systems, etc.) together to simplify, and automate business processes. Each application may reside on different operating systems and/or use different database solutions, computer languages, or data formats. Integration middleware systems can address the fundamental need for application integration by acting as the messaging hub between applications. These middleware systems mediate messages between the applications typically in formats like Extensible Markup Language (XML) and JAVASCRIPT Object Notation (JSON). However, the business application data is stored on relational databases. In some implementations, even middleware systems—typically not Java Messaging Service-based solutions—use relational databases for reliable, asynchronous messaging. Accordingly, data format conversions are often required between the application message formats and message formats used by the relational database (e.g., Structured Query Language (SQL), DATALOG, etc.).

SUMMARY

The present disclosure relates to computer-implemented methods, computer-readable media, and computer systems for performing integration logic programming. One computer-implemented method includes receiving, by operation of a middleware system, first information in a first format corresponding to a first application, applying, by operation of the middleware system, one or more integration logic programming (ILP) patterns to the first information, the one or more ILP patterns representing application integration semantics using a logic programming language, generating, by operation of the middleware system, a second information in response to applying the one or more ILP patterns to the first information, and outputting, by operation of the middleware system, the second information in a second format corresponding to a second application.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the logic programming language comprises DATALOG or PROLOG.

A second aspect, combinable with any of the previous aspects, wherein the one or more ILP patterns comprise one or more of a content-based router, a message splitter, a message aggregator, a message filter, or a content filter.

A third aspect, combinable with any of the previous aspects, comprising defining the one or more ILP patterns by representing application integration semantics using the logic programming language.

A fourth aspect, combinable with any of the previous aspects, wherein applying one or more ILP patterns to the first information comprises applying a composited ILP pattern to allow extended logic programming processing, the composited ILP pattern comprises two or more ILP patterns.

A fifth aspect, combinable with any of the previous aspects, wherein applying one or more ILP patterns to the first information comprises converting the first information in the first format into a canonical data model format, and applying the one or more ILP patterns to the converted first information in the canonical data model format.

A sixth aspect, combinable with any of the previous aspects, wherein the first format is Extensible Markup Language (XML), JAVASCRIPT Object Notation (JSON), Java, or C#, and the canonical data model format is DATALOG, PROLOG, or Structured Query Language (SQL).

The subject matter described in this specification can be implemented in particular implementations so as to realize one or more of the following advantages. An embedding of relational logic processing in conventional integration systems would allow, for example, (1) a declarative description of integration semantics (instead of, e.g., JAVA, C#), (2) relational logic data processing closer to its actual storage representation, and (3) leveraging parallelizable query execution through data partitioning. In some implementations, using DATALOG or PROLOG (as example logic programming languages) can make Enterprise Integration Patterns (EIPs) configurable through DATALOG rules, and allow for more complex DATALOG processing through the composition of EIPs and efficient evaluation of DATALOG on relational data.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1 includes sample integration logic programming (ILP) codes according to an implementation.

FIGS. 2-6 include listings showing example integration logic patterns according to an implementation.

FIG. 10 is a listing illustrating example DATALOG rules for heat map computation according to an implementation.

FIG. 11 is a listing illustrating an example DATALOG program within a DATALOG pipeline according to an implementation.

FIGS. 12A and 12B are plots illustrating example heat maps of a soccer player according to an implementation.

Like reference numbers and designations in the various drawings indicate like elements.

DETAILED DESCRIPTION

Figure 7:
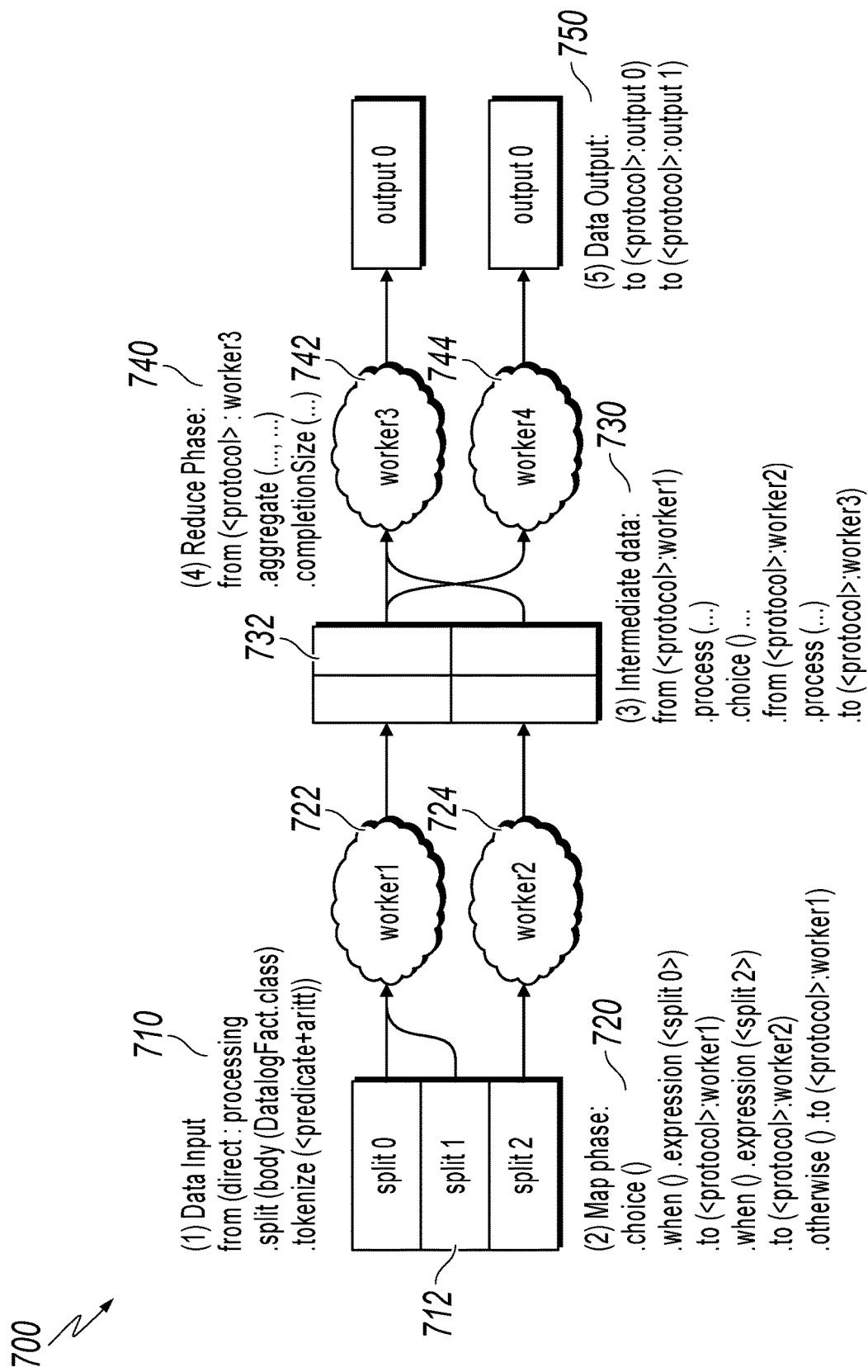
FIG. 7 is a block diagram illustrating an example Map/Reduce-style processing with integration logic programming according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

In some instances, although the business application data is stored in relational databases, the programming languages in integration middleware systems are not relational data-centric. In some implementations, efforts have been made to combine (parts of) middleware and database systems on the database level. The integration operations can be "pushed-down" to be closer to the database systems to avoid unnecessary data-shipments and to achieve faster computation. However, the resulting "push-down" integration semantics and business logic can lead to complicated programming languages for the databases.

In some implementations, relational logic programming can be "moved-up" for implementing integration semantics, for example, within a standard middleware system. Application integration can be combined with relational logic programming (e.g., PROLOG and DATALOG) for declarative middleware pipeline processing. For example, the integration semantics can be described by the well-known Enterprise Integration Patterns (EIP). The work on Enterprise Integration Patterns (EIP) provides the building blocks for implementing integration systems by defining a comprehensive set of standard integration patterns like routing and mapping. These patterns specify the integration semantics, which can be expressed by means of logic programming. As an example, these patterns can be combined with DATALOG$^+$ (non-stratified DATALOG) for declarative and more efficient middleware pipeline processing and parallel computation capabilities. As a result, the investments in the existing connectors, protocol adapters and middleware systems can be leveraged together with the data-centric logic processing for declarative integration programming. Such a combination of the application with logic programming can be referred to as integration logic programming (ILP).

This disclosure generally describes computer-implemented methods, computer-program products, and systems for performing integration logic programming (ILP). ILP can represent the integration semantics using logic programming. Example implementations of the ILP can include combining middleware systems with DATALOG on an application server level, forming relational logic integration patterns (e.g., by applying DATALOG to the integration domain), and building declarative integration pipelines using multiple relational logic integration patterns. Definitions of combined language constructs for expressive logic programming are provided. Performance analysis and applications of the ILP are also provided.

With ILP, integration systems can run declaratively configured integration semantics, e.g., mapping, routing, splitting, aggregation, based on logic programs, and allow for data-centric processing of messages within the middleware pipeline, which enables more efficient exchange formats like the relational model. At the same time, the composition of integration logic programming extends logic programming with built-in capabilities like if/else-conditions, stream processing, and map/reduce, which require heavy extensions to logic program evaluation, e.g., in DATALOG.

In some implementations, APACHE CAMEL, an Open-Source integration system implementing most of EIPs, can be used as an example integration system for integration semantics throughout this disclosure. However, additional or different integration systems can be used. The example techniques described here can apply to all integration and workflow management systems.

Likewise, DATALOG is an example logic programming language used for reasons including ease of explanation and understanding and is not meant to limit the concepts to the provided examples. Additional or different logic programming language(s) can be used.

FIG. 1 includes sample integration logic programming (ILP) codes according to an implementation. For instance, Listing 1 shows an example ILP for a TWITTER feed which subscribes to daily trends. Listing 2 shows an example JAVASCRIPT Object Notation (JSON) representation of Twitter trends. Listing 3 shows example DATALOG facts of Twitter trends. Note that examples in this disclosure use the CAMEL JAVA domain-specific language (DSL) representing the integration programming language due to its compactness. Other compatible DSLs (e.g., XML-based) can also be used.

As illustrated in Listing 1, at line 1, the trends are received in JSON (see Listing 2), which is unmarshalled to DATALOG facts using the ILP (un-) marshalling capabilities (see Listing 3). Accordingly, from line 2, the canonical data model is DATALOG. That allows for DATALOG with choice, where the expression is of the form predicate+arity with optional projection parameters (not shown) and the condition expression, which uses a "string contains" built-in predicate=c(X,Y). The routing logic (i.e., a choice in CAMEL) is based on the evaluation of the DATALOG expression and passes the facts to one of the two receivers (e.g., other integration logic programs or real message endpoints). The example in FIG. 1 illustrates how a Content-based Router pattern can be implemented using logic programs and at the same time the extension of standard DATALOG by the symbiosis with integration programs to support richer semantics like DATALOG with choice, without changing the actual DATALOG evaluation.

In some implementations, an integration middleware system can include a collection of software and hardware that provides technologies and services to enable integration of systems and applications and to enable interoperability between applications that run on different systems, using different database solutions, computer languages, or data formats. The middleware system can supply services so the applications can exchange data in a standards-based way.

In some implementations, the middleware system can include a set of protocol adapters for receiving messages through different protocols (e.g., HTTP, TCP/UDP) and in different formats (e.g., Simple Object Access Protocol (SOAP), CSV), and a configurable pipeline that executes integration operations on the arriving messages. In APACHE CAMEL, a message can include a set of header entries that contain meta-data about the message payloads, a set of attachment entries for passing binary data (e.g., documents, pictures) and one body representing the payload in an arbitrary format. APACHE CAMEL offers a set of transport protocol adapters and format handlers for message reception, and a configurable pipeline that executes integration logic on those messages, while providing extension mechanisms for embedding new language constructs.

CAMEL's integration programming constructs for embedding new language definitions include Component/Endpoint, Expression, Language and Marshal/Unmarshal. Subsequently, the basic DATALOG language embedding into CAMEL can be defined by example. These constructs can be used as building blocks of integration logic programming and can be referred to as relational logic integration patterns, logic integration programs, or DATALOGBlocks (DL$^+$B).

CAMEL Component/Endpoint

A message endpoint constitutes a protocol adapter that produces or consumes messages. The syntax for the DATALOG consumer is from ("datalog:"+"<fact-source>"+ "?<query parameters>"), while the Uniform Resource Identifier datalog defines the DATALOG component, which consumes DATALOG facts from a fact-source (e.g., file containing parsable DATALOG facts, relations from a database table), and a configurable query section ?<query parameters>. The query parameters are separated by "&" and can specify CAMEL consumer properties like consumer.delay=1000 for a polling consumer that consumes facts every 1000 milliseconds as well as DATALOG-specific parameters, e.g., rules rules=r(X):–s(X)·r(X):–r(Y),a(Y,X) that are evaluated on the consumed facts. The DATALOG consumer parses the relations from the source to produce facts and emits the resulting facts from the query evaluation. The consumer is typically used to generate test data for the experimental evaluation of the system. Similarly, the DATALOG producer allows for parameterization of rules, however, the producer applies them before writing the result to a fact-source, which can be used to verify evaluation results.

DATALOG Expressions and Predicates

DATALOG expressions can include a list of rules and a query. The rules and query can be executed on the message body. For embedding arbitrary language constructs, CAMEL allows implementations of specific Expression and Predicate extensions. For ILP, a DATALOG expression:

DATALOGExp([<predicate+arity>|rules][,<parameters>], <conditionexpression>)

can be specified, where either the information about the predicate name and the arity of the fact <predicate+arity> is used to identify the correct relation or a set of rules is evaluated. In some instances, for example, in case the relation's arity is big, a set of parameter names <parameters> can be specified for projection, e.g., when using rules for evaluation, and the <conditionexpression> contains built-in operations like=, <=. The evaluation of the rules or condition expressions output the resulting facts, which can be embedded into CAMEL constructs like split(exp) or split( ).tokenizer(exp) that implement a TokenizerExpression. However, some constructs like aggregate(correlationexp, . . . ), chocieo.when(exp) or fdter(exp) require a BOOLEAN output. In this case, an empty evaluation result can be mapped to false and true otherwise.

Expressions evaluating to a BOOLEAN value are called predicates. A CAMEL predicate evaluates to a BOOLEAN result and can be compared to a built-in operator in DATALOG. Predicates can be considered as a sub-set of expressions, and thus are not discussed separately for ILP.

CAMEL Languages

The CAMEL languages are related to expressions. The difference from expressions is the ability to introduce another syntactic CAMEL construct for DATALOG, datalog (String), that results to the instantiation of DATALOG Exp( . . . ) at runtime. For example, the statement fdter(exp) is a synonym to filter( ).datalog([<predicate+arity>|<rules>).

Marshal/Unmarshal

Marshaling is the process of transforming an incoming data into a data format suitable for storage or transmission. In some implementations, the DATALOG language constructs can only work on the messages if the message payloads are DATALOG facts. Hence, a format conversion between facts and any format (e.g., JSON, XML, CSV) is required. For Marshal/Unmarshal operations, CAMEL offers the implementation of a DataFormatDefinition, which are defined to convert a specific format to DATALOG (e.g., using a DATALOG parser) and vice versa.

In some implementations, when connecting several applications, various integration patterns are executed on the transferred messages in a uniform way. The messages arriving at manifold protocol adapters (e.g., SOAP, CSV, JSON) can be transformed into an internal format understood by the integration pattern implementation, called Canonical Data Model, before the messages are transformed to the target application's format. For instance, marshal operations can be performed to transform the incoming data into the canonical data model. This model can be defined as Datalog program, which can include a set of facts, optionally a set of rules and a set of meta-facts that describe the transferred data. The meta-facts can encode the name of the fact's predicate and all parameter names within the relation as well as their data types (see Listing 3 in FIG. 1). With that information, parameters can be accessed by name instead of position, e.g., for selections, projections, joins, in the integration logic programs.

For instance, referring back to FIG. 1, Listing 1 shows a receiving protocol adapter for Twitter messages in JSON format (from("twitter: . . . ")). The messages are processed and the processed messages are sent through outgoing protocol adapters to different receivers, for example, either to(<recv:a>) or to(<recv:b>). The patterns in-between, like content-based routing, are based on standard DATALOG evaluation on the defined canonical data model. The incoming JSON format is transformed to DATALOG facts, the operations are applied, and resulting facts are transformed to the target (or receiving) application's format.

For ILP, the integration logic programs (also referred to as integration logic patterns or ILP models) represent a synthesis of integration programming (e.g., based on EIPs as fundamental building blocks) and DATALOG evaluation. For example, DL$^+$B patterns are example integration logic programs using DATALOG$^+$ and are based on standard DATALOG evaluation on the defined canonical data model. In some implementations, while messages are routed through integration pipelines, the DL$^+$B patterns can perform integration logic operations on the messages. From the large amount of integration patterns, several representative patterns are selected and the mappings to ILP are defined subsequently. Example DL$^+$B patterns are described with respect to FIGS. 2-6 in the following, which includes, for example, Content-based Router, the antagonists Message Splitter and Message Aggregator, Message Filter and Content Filter.

Message and Content Filters

The Message Filter is a special routing pattern with a single message input and output (1:1), which removes messages from the pipeline according to a CAMEL-DATALOG predicate evaluated on the data within the message's payload or routes the original message.

FIG. 2 is a listing, Listing 4, showing an example integration logic pattern, Message Filter, according to an implementation. Listing 4 shows the usage of the CAMEL-DATALOG predicate in a CAMEL (message) filter. The predicate is evaluated on the set of facts within the message, while the message is routed to <recv>, if it evaluates to true.

FIG. 3 is a listing, Listing 5, showing another example integration logic pattern, Content Filter, according to an implementation. Comparable to projections in DATALOG, the content filter allows removing parts from the original message's payload passing a transformed message to the pipeline. Hence it can be seen as a special Message Translator pattern, which translates one message format to another. Listing 5 shows the usage of the DATALOG construct (datalog(list(<rule>)[,<query>])) that allows evaluations of arbitrary filter-/mapping rules.

Content-Based Router

The DATALOG with choice example in Listing 1 in FIG. 1 is an example Content-based Router pattern. The router features a choice on the content of the message to determine the route to choose. The routing can be a 1:n fork on a pipeline, while the original message is passed 1:1 to the selected receiving route.

FIG. 4 includes Listings 6A and 6B, showing example integration logic patterns for Content-basedRouter, according to an implementation. As illustrated in Listing 6A, the integration programming construct choice( ).when( ) . . . otherwise( ) is extended by a DATALOG expression (i.e., the DATALOGExp). The fact's predicate name and arity <predicate+arity> are used to select the correct relation, similar to a Message Translator pattern, addressable by name (e.g., through internal meta-fact mapping), and a set of condition expressions (i.e., DATALOG selection operation). A positive evaluation of the DATALOG expression on the selected relation pushes the message to the route. If all case-expressions are evaluated negative, the message goes to the otherwise route. Since a router only passes the original message once, the first positively evaluated expression routes the message exclusively.

Listing 6B shows another integration logic pattern, where the DATALOG expression includes one or more predicates (<predicate>). The router can include multiple message filters and send the incoming message to the route of the first positively evaluated CAMEL-DATALOG predicate. If all case-expressions are evaluated to be false, the message can be routed to the otherwise route.

DATALOG Message Splitter and Aggregator

In addition to the base router pattern, the antagonist patterns message splitter and aggregator (comparable to map/reduce) are widely used. A splitter consumes a message from the pipeline and splits the original message into multiple new messages according to a split-expression (1:n message fork), while the pipeline branching is 1:1. A pattern with n:1 message cardinality is the Aggregator.

FIG. 5 includes Listings 7A and 7B showing example integration logic patterns for Splitter, according to an implementation. The splitter shown in Listing 7A splits the set of incoming lists of facts for a DATALOG language artifact datalog(<predicate+arity>), while copying the corresponding meta-facts and rules. That means, a set of facts o(x). p(x,y). q(x,y,z) in one message is split to two messages according to the split expression datalog(o1), namely $m_1$=o(x) and $m_2$=p(x,y)·q(x,y,z). Alternatively, the statement split( ).method(FactSplitter.class, "split") splits the set of facts to separate messages, while using a built-in method FactSplitter.class::split. Technically, it implements an iterable return that converts each row in the list to a new message. The statement split(body(DATALOGFact.class).tokenize(<predicate+arity>)) with the fact representation DATALOGFact splits only the facts according to the <predicate+arity> parameterization to different messages.

In addition or as an alternative to splitting the set of facts based on the DATALOG predicate name, a list of expressions can be used to split the set of facts into multiple messages. Each expression can be evaluated on the incoming message and each evaluation result is sent as a separate message. Listing 7B shows a Splitter that splits the set of incoming facts within the original message to several outgoing messages according to a list of CAMEL-DATALOG expressions.

FIG. 6 includes Listing 8 showing example integration logic patterns for Aggregator, according to an implementation. As shown in Listing 8, the aggregator receives a stream of messages and correlates messages according to a correlation condition <correlation condition>. When a complete set of correlated messages has been received, the aggregator applies an aggregation function <aggregation function> and publishes a single, new message containing the aggregated result. The aggregator can be persistent, when storing a set of aggregates. Since the canonical data model includes DATALOG relations, no format conversion for the storage on the database is required. In some implementations, the pattern implementation might not store complete messages, but only retain the information required for aggregate calculation. The aggregation function can be defined as DATALOGExpression. The CAMEL completion conditions completionSize(<completion condition> and completionTimeout(<completion condition>) can be parameterized by an integer value or a DATALOGExp.

The capabilities and language constructs of integration systems differ. However, the open source system APACHE CAMEL implements most of the "de-facto" standard EIPs, whose definition is the same across these systems. The expressiveness of the defined $DL^+B$ patterns depends on the capabilities of the DATALOG system and the mapping to the integration language constructs. This work builds on recursive $DATALOG^+$ (unstratified DATALOG) with extensions for numeric expressions and String comparison. With the DATALOG Programs as canonical data models, all $DL^+B$ operations can work on the message's DATALOG facts payload. Through the created and transferred meta-facts, which describe the actual facts, the facts' parameters can be accessed by name, when specifying rules for CAMEL-DATALOG expressions or predicates. This is especially useful when dealing with long (automatically generated) facts during the (un-)marshalling. Furthermore meta-facts resolve the problems with Data formats like JSON and XML, which do not guarantee the order of parameters and whose relations can vary in the number of their parameters for the same predicate. The meta-facts are used to allow for consistent rule definition in $DL^+B$. CAMEL-DATALOG expressions are the basic constructs for the configuration of the $DL^+B$ EIPs. As these expressions and predicates include a list of DATALOG rules and an optional query, the full capabilities of the underlying DATALOG implementation can be leveraged. Making the query optional provides the flexibility to execute multiple rules on a message. The whole intentional database can be part of the expression's result as opposed to a single query's result.

These expressions can be used in the $DL^+B$ Content Filter pattern (e.g., as shown in Listing 5 of FIG. 3) to transform the structure of the original to an output message, e.g., using projections, selections, etc. Thus this pattern can also be used as a Message Translator.

The Message Filter (e.g., as shown in Listing 4 of FIG. 2) requires a BOOLEAN decision on whether to pass a message further or to remove it from the pipeline. According to the definition, the filter can accept arbitrary $DL^+B$ expressions and allow using arbitrary CAMEL-DATALOG predicates to decide whether a message is left in the pipeline or filtered out. For example, by using predicates, it is possible to verify the data structure and to check whether a message contains certain facts.

Content-based Router also requires a BOOLEAN output for the decision on the route selection. In some instances, one major issue with the Content-basedRouter is "overlapping" rule evaluation results, which leads to more than one true condition on routes. In those cases, either a "take first/last/best" strategy can be used, while "best" means most facts, or, if known beforehand, the cases could be limited to a sequence of BOOLEAN route-branchings. For instance, in a sorted list of predicates, the more precise the query the earlier it is in the list. These precise queries can be executed first. Although the rules may overlap with later ones, the message can be routed to the correct route if sorting is correct.

Similarly, the <correlation condition> of the Aggregator pattern can include a list of DATALOG predicates, from which multiple rules can evaluate to be true for a single incoming message, here a "take first/last/best" strategy can also be used. Before evaluating an aggregation $DL^+B$ expression, the facts and meta-facts of multiple DATALOGs are combined. This leads to possible merge conflicts, when several messages contain facts with the same predicate name, but different variables. This can be mitigated by renaming the facts prior to aggregation using a message filter.

The Splitter pattern can use a list of $DL^+B$ expressions to generate multiple messages by evaluating each expression on the message and forwarding each evaluation result as a separate message. This could lead to a non-disjunctive splitting. Subsequently, problems can occur when merging the messages, as there are duplicate facts. This issue can be handled within the Aggregator.

In some implementations, two or more single programming patterns can be composed together to form more complex/expressive patterns, which allow for extended DATALOG processing. Some example composited patterns are discussed in the following.

DATALOG Stream Processing

Following the basic real-time stream processing rules such as "Keep the Data Moving," and "Query using SQL on Streams," (i.e., straight-through processing programming model without persistent storage), a coarse-granular sliding window merge operator can be constructed using the ILP models (e.g., the $DL^+B$ patterns described with respect to FIGS. 2-6). The window can specify the scope of the current query. For example, the aggregator in Listing 8 can be configured to support the common time-based (completion-Timeout) or a static number of messages based on window (completionSize). The DATALOG union operator can be a simple stream-oriented merge operator, which represents the <aggregation function>. The <correlation condition> can be set to constant(true), thus correlating all messages. A self-defined correlation mechanism would lead to different sequences within the windows. In the standard configuration, the sliding window operator can consume the messages in a disjoint manner without overlap. Existing DATALOG extensions for stream processing (e.g., Streamlog) support the observation that DATALOG rules can be used within window techniques.

DATALOG Map/Reduce

The parallel processing with map and reduce functions can be implemented by the Scatter/Gather standard integration pattern that combines a splitter with an aggregator pattern.

FIG. 7 is a block diagram 700 illustrating an example Map/Reduce-style processing with integration logic programming according to an implementation. FIG. 7 shows a canonical mapping of map/reduce-style processing using the ILP model. The data input at phase 1) 710 can include a set of parsable DATALOG facts, which are split according to arbitrary DATALOG expressions on node::1 712. The map phase 2) 720 can be made explicit through a content-based routing pattern (choice( ).when( ).expression( . . . )). The messages are distributed to CAMEL runtime instances on the different processing units worker1 (node:w1) 722 and worker2 (node:w2) 724. After the messages have been processed, at phase 3) 730, intermediate results are shared on an intermediate node node:i1 732. Then, the messages are routed to another set of dedicated worker nodes (node:w3 742, node:w4) 744 at reduce phase 4) 740, which run configurable ILP aggregation programs to reduce the data, before output 5) 750. The fact output can be input for another round of processing or unmarshalled as a final result. The application of ILPs to map/reduce-style processing makes the message distribution configurable through the DATALOG choice pattern.

Figure 8:
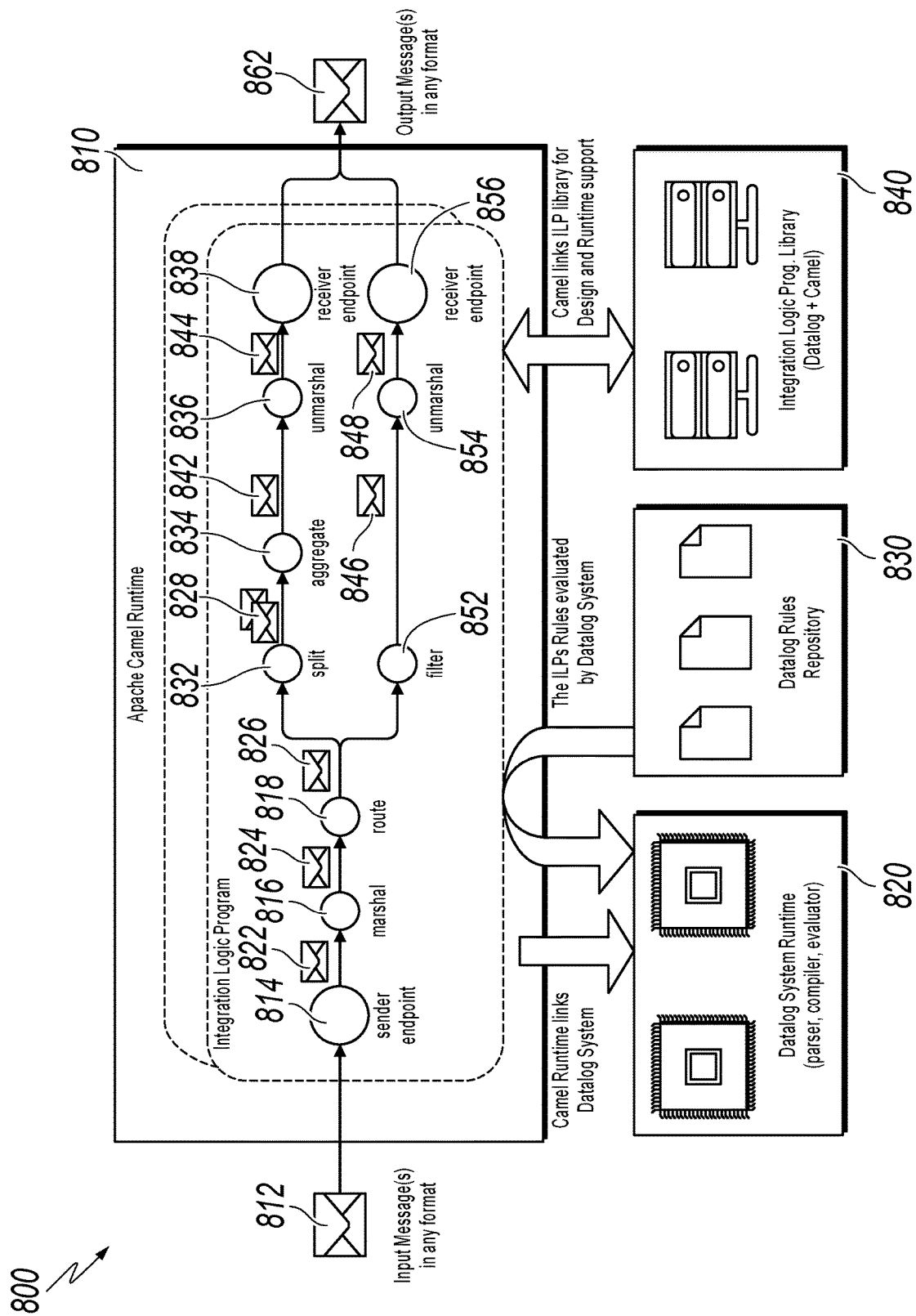
FIG. 8 is a block diagram illustrating an example computing system for performing integration logic programming according to an implementation.

FIG. 8 is a block diagram illustrating an example computing system 800 for performing integration logic programming according to an implementation. The illustrated computing system 800 includes or is communicably coupled with an APACHE CAMEL runtime 810, a DATALOG system runtime 820, a DATALOG rules repository 830, and an integration logic programming library 840. The example computing system 800 can be implemented as a middleware system for application integration. In some implementations, additional or different components can be included or otherwise coupled to the computing system 800. The computing system may be configured in another manner different from the example configuration of FIG. 8.

The APACHE CAMEL Runtime 810 is an example integration system runtime for performing application integration. An integration system runtime can be an algorithmic software engine capable of performing, among other things, application integration (e.g., enterprise application integration) and any appropriate function consistent with this disclosure. In some implementations, the APACHE CAMEL Runtime 810 can be used to perform integration logic programming, for example, using ILP patterns based on EIPs and logic programming. The APACHE CAMEL Runtime 810 can include multiple endpoints/components and processors. The APACHE CAMEL Runtime 810 can receive/send messages from/to an endpoint. The components can provide a uniform endpoint interface and can act as connectors to all other systems. For example, the APACHE CAMEL Runtime 810 can include a Java Message Service (JMS) component with a JMS application programming interface (API) connected to a JMS provider, an HTTP component with a servlet API connected with an HTTP client, a file component connected to a file system, or other components. The processors can be used to wire endpoints together and to perform integration operations such as, routing, transformation, mediation, interception, enrichment, validation, tracking, logging, or other operations.

The DATALOG system 820 can include one or more DATALOG parsers, compilers, or evaluators. The parser can translate DATALOG programs to an internal representation, which is compiled to executable evaluation plans. For example, the naive-recursive evaluation can be extended by built-in functions for contain operations=c(X,Y) on character sequences and integers, which reads that character sequence Y is contained in X, binary, numerical built-ins of the form op(X,Y), where op, e.g., =, >, >=, and a unary count(<predicate+arity>) function, which determines the number of occurrences of a relation. The language and programming model for integration logic programs link the DATALOG system 820 and the CAMEL system 810 during design and runtime.

The DATALOG rules repository 830 can include multiple DATALOG rules. A DATALOG program includes a set of DATALOG rules. In some implementations, a set of rules can be combined with a set of facts and optionally a set of meta-facts to form the canonical data model (e.g., 824, 826, 828, etc.) used by the APACHE CAMEL Runtime 810 for performing integration logic programming.

The integration logic programming library 840 can include the ILP patterns or models that combine integration patterns (e.g., the EIPs) with logic programming (e.g., using DATALOG). The integration logic programming library 840 can include the ILP patterns described with respect to Listings 1-8 in FIGS. 1-6, or any other ILP patterns. Each ILP pattern can bind to one or more DATALOG rules or expressions from the DATALOG rules repository 830. In some implementations, the DATALOG rules repository 830 can allow for variable instantiation of the ILP patterns. During runtime, the ILP patterns can be instantiated with the correct content and represent executable integration pipelines with DATALOG evaluation.

Figure 9:
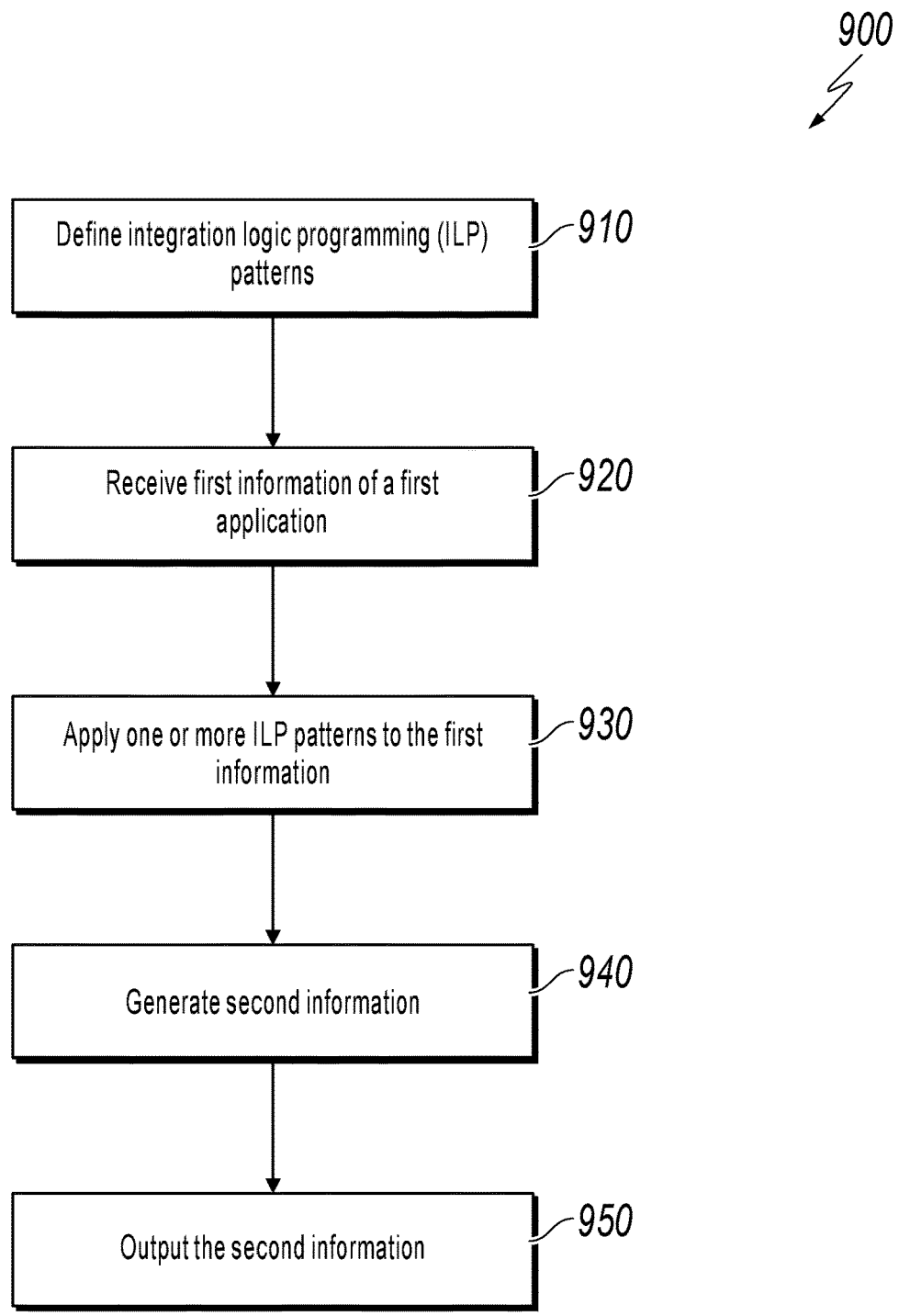
FIG. 9 is a flow chart illustrating a method for performing integration logic programming according to an implementation.

FIG. 9 is a flow chart 900 illustrating a method 900 for performing integration logic programming according to an implementation. For clarity of presentation, the description that follows generally describes method 900 in the context of FIGS. 1-8. However, it will be understood that method 900 may be performed, for example, by any other suitable system, environment, software, and hardware, or a combination of systems, environments, software, and hardware as appropriate. In some implementations, various steps of method 900 can be run in parallel, in combination, in loops, and/or in any order.

At 910, one or more integration logic programming (ILP) patterns can be defined or otherwise identified. The ILP patterns can be defined, for example, by representing application integration semantics using a logic programming language (e.g., DATALOG, PROLOG, SQL, etc.). For example, the ILP patterns can be defined based on EIPs that are used as example integration semantics. Example ILP patterns are described with respect to Listings 1-8 of FIGS. 1-6 including a content-based router, a message splitter, a message aggregator, a message filter, or a content filter. Additional or different EIP patterns can be defined. In some implementations, the ILP patterns can be defined in another manner. From 910, method 900 proceeds to 920.

At 920, first information can be received, for example, by a middleware system (e.g., the example middleware system 800 of FIG. 8). The information can be a message, a statement, a signal, or other expression. For example, the first information can be the input message 812 received by the APACHE CAMEL Runtime engine 810 of the middleware system 800. The first information (e.g., the input message 812) can be received by a sender endpoint 814 (e.g., a transport protocol adapter and/or format handler) for message reception. The first information can be in a first format corresponding to a first application. For example, the first format can be one or more of Extensible Markup Language (XML), JAVASCRIPT Object Notation (JSON), Java, C#, or other types of programming languages suitable for the first application. From 920, method 900 proceeds to 930.

At 930, one or more ILP patterns can be applied to the first information, for example, by the middleware system. The ILP patterns can be applied to perform declarative application integration operations on the first information. In some implementations, applying one or more ILP patterns to the first information can include, for example, converting the first information in the first format into a canonical data model format, and applying the one or more ILP patterns to the converted first information in the canonical data model format. The canonical data model format can be an internal, relational message format. The canonical data model format can be, for example, DATALOG, PROLOG, or SQL. For instance, the canonical data model format or the internal format can define a message as DATALOG facts, rules (optional) and meta facts (see e.g., Listing 3, 160 of FIG. 1).

Operations to transform incoming message formats into the internal one allow the execution of the ILP operations on the data. For example, the input message 812 can be marshalled at 816 into a canonical data model 824 (e.g., a DATALOG program). Subsequently, one or more ILP patterns such as a router 818, splitter 832, aggregator 834, or filter 852 can be applied to the canonical data models 824, 826, and 828 for integration operations such as routing, splitting, aggregation, and filtering, respectively. The one or more ILP patterns can be the example ILP patterns described with respect to Listings 1-8 in FIGS. 1-6, or they can include additional or different patterns.

In some implementations, a composited ILP pattern can be applied to the first message (e.g., in a canonical data model). The composited ILP pattern can include two or more ILP patterns to allow, for example, extended DATALOG processing such as stream processing, Map/Reduce, or other extended logic programming processing. From 930, method 900 proceeds to 940.

At 940, second information can be generated in response to applying the one or more ILP patterns to the first information. The second information can be the intermediate result after applying one or more ILP patterns, or the ultimate result after the first information passing through an integration pipeline that includes multiple ILP patterns. For example, the second information can include the intermediate messages (e.g., messages 826, 828, 842, 844, 846, or 828) or the output message 862. In some implementations, the second information can include one or more messages processed by the ILP patterns via different integration pipelines. For example, the second information can be the message 862 including both the message 844 and message 848 that have been split and aggregated, and filtered, respectively.

In some implementations, generating second information can include, for example, generating the second information in a canonical data format in response to applying the one or more ILP patterns to the first information; and converting the second information in the canonical data format into a second format corresponding to a second application. The conversion can include a translation from the internal message format to an arbitrary output format. For example, after applying the aggregator 834 to the message(s) 828, the message 842 can be obtained or otherwise generated in a canonical data model format (e.g., as a DATALOG program). The message 842 can be unmarshalled at 836 and converted into the message 844 in a second format, for example, specified by the receiver endpoint 838 that coupled to a receiving or target application. The second format can be, for example, XML, JSON, Java, C#, or other types of programming languages suitable for the second application or a database associated with the second application. The first and second formats can be the same or different. From 940, method 900 proceeds to 950.

At 950, the second information can be output. The second information can be output, for example, by a middleware system (e.g., the APACHE CAMEL system 810) to a second application. In some implementations, the second information can be output, for example, into one or more databases associated with the middleware system, the first application, or the second application. In some implementations, the second information can be, for example, an intermediate result, and be output to the middleware system itself for further processing. The second information can be output in another manner. After 950, method 900 stops.

In some implementations, unlike the middleware system of traditional application integration techniques that perform integration operations on messages in JSON or XML format, the example method 900 enables the middleware system to perform declarative integration operations (e.g., by applying ILP patterns) on information in a relational format or logic programming format (e.g., DATALOG, PROLOG, SQL, etc.) throughout the declarative integration pipeline. For example, as illustrated in FIG. 8, once the input message 812 (can be in any format) is converted to the canonical data model (e.g., DATALOG in this example), the messages (e.g., messages 824, 826, 828, 842, and 846) remain in the DATALOG format throughout the declarative integration processing pipelines until outputting to a target format suitable for the target application. The middleware system 800 can directly apply ILP patterns on the messages in a relational format that is suitable or closer to the data format of the relational database associated with the middleware system and the applications.

In some instances, the example ILP patterns and logic integration programming techniques can be used for event stream data processing or other implementations in addition to application integration. For example, an experiment has been conducted by applying logic integration programming to a soccer test-match data set.

In this experiment, all measurements were performed on one server equipped with two Intel 64 processors (12 cores), 24 GB of main memory, running Windows 7. The DATALOG system under test is a Java implementation of the standard naive-recursive DATALOG evaluation (i.e., without stratification) in version 0.0.6. The middleware system is an APACHE CAMEL version 2.12.2 runtime that we extended by our language constructs. The tests are executed on the JDK version 1.7.0.

In 2013, the "DEBS Grand Challenge" published a soccer match data set, containing all player positions during the match and challenged mostly the numeric processing capabilities of (distributed) computing systems with four queries (Q1-4: "Running Analysis", "Ball Possession", "Heat Map", "Shot on Goal"). A similar data set captured during one of the German national team test-matches in 2013 is chosen for this experiment. The data set contains information about the complete match, the teams and the players. For the two periods of 45 minutes (i.e., starts at 0 and ends at 23209) of a normal soccer match, "player-trajectory" data tracks each player's position on the field as Cartesian coordinates x and y every tenth of a second. Hence, for each player (that was not substituted during the match) there are 23209 tracked positions per period with its exact tracking time. The field is a standard 105×68 meter FIFA field. The kick-off point in the middle of the field denotes (x=0,y=0). To the left and bottom the x-positions become negative and to the right and top positive. The data set contains position information for 36 players that have been tried out during the test-match and the position of the ball for the complete match. The players will not be named, but referred to by their positions.

In particular, the Query 3 (Heat Map) is selected: "The goal of this query is to calculate statistics for how long each of the players spent in which region of the field." A grid with 105 columns and 68 rows of equal size is defined. In contrast to the "Grand Challenge", where a maximum grid had 6,400 cells, the grid used in this evaluation has 7140 disjoint cells. The result of the query shall be the time spent for each cell and player.

FIG. 10 is a listing, Listing 9, showing example DATALOG rules used for heat map computation according to an implementation. Listing 9 includes binary numerical expressions using DATALOG rules. With 7140 of the position-qad-x-y rules the field is partitioned.

FIG. 11 is a listing, Listing 10, illustrating an example standard DATALOG program within a DATALOG pipeline according to an implementation. Using standard DATALOG, the player's position facts are combined to one DATALOG Program and evaluated. For comparable performance measurements, the evaluation of the DATALOG Program, which computes the heat map (.datalog(Sheatmap-rules)), is embedded into an APACHE CAMEL route (route: 1). Listing 10 shows the route, which loads the trajectory data file (from("file:data-sequential")) in XML format and converts it to DATALOG Facts (.unmarshal(xml> datalog facts)). Time measurements are added at lines 3 and 5. The actual DATALOG evaluation happens in the ILP language construct (.datalog(Sheatmap-rules)).

Figure 12B:
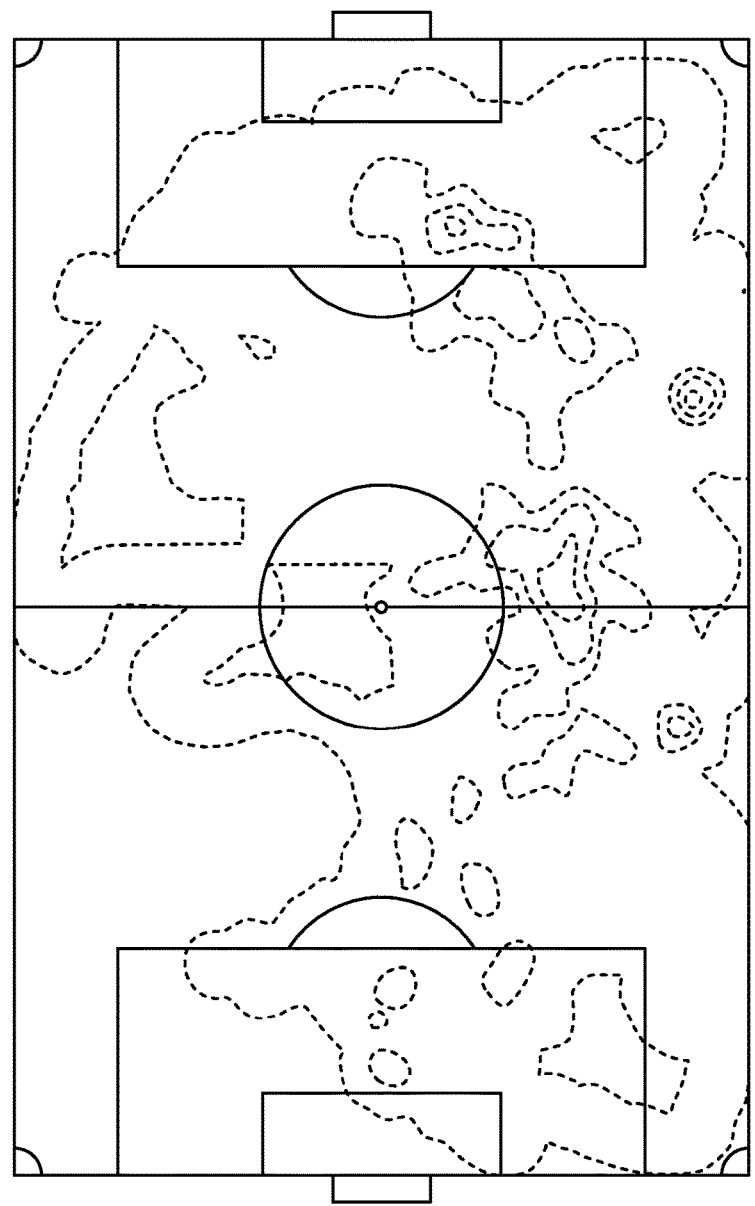

FIGS. 12A and 12B are plots 1200 and 1205 illustrating example heat maps of a soccer player according to an implementation. Specifically, the heat maps are calculated by the DATALOG Pipeline with the configuration from Listing 10 and plotted to a soccer field using a graphics program for a German right-wing forward. FIG. 12A shows the first period when the German team plays from right to left and FIG. 12B shows the second period when the German team plays from left to right. The forward's "strong foot" is his right foot and the tactically expected position is the right, forward field. The forward was substituted after 80 minutes due to injury in the second period. The heat maps 1200 and 1205 include different concentrated areas (e.g., areas 1210 and 1215) showing different levels of activity of the forward in the corresponding locations. For example, the areas 1210 and 1215 represent the most frequently visited areas of the forward during the first and second periods, respectively. In some implementations, these indicated areas can be represented by color, shading, etc.

Although the heat maps can be computed using the standard DATALOG implementation (with numeric expressions), the computation time can be improved by leveraging the streaming and parallel processing capabilities. Similar to Listing 10, integration logic programming can be comparably configured with the same heatmap-rules and union-rules to compute the heat maps for each player and cell combination.

Figure 13:
FIG. 13 is a listing illustrating an example DATALOG pipeline according to an implementation.

FIG. 13 is a listing, Listing 11, illustrating an example DATALOG pipeline according to an implementation. Listing 11 shows the file loading (line 1) and unmarshalling (line 2), before splitting the facts for each player (.split( ).tokenize ("PLAYER")) for streaming and parallel processing (line 4). That means the heat map is evaluated in parallel for each player. APACHE CAMEL administrates a thread pool that spawns multiple threads for the processing. Comparable to Listing 10, time measurements are conducted at lines 5-7. The evaluation results to a heat map per player for all cells on the field. To answer Query 3, the Aggregator pattern can be used to evaluate a union over all resulting facts with a completion condition on the number of players (lines 6, 7).

In Listing 11, ILP is used in order to parallelize the heatmap calculation by using the EIP constructs splitter and aggregator. By contrast, in Listing 10 of FIG. 11, the embedding of standard DATALOG in APACHE CAMEL, DATALOG is not used as configuration of any of the occurring integration patterns; the whole DATALOG processing takes place in line 4 where DATALOG rules (S{heatmap-rukes}) are applied to the facts, whereas line 2 converts a fact source in XML data format into DATALOG facts and lines 3 and 5 are used for performance measurement.

Figure 14:
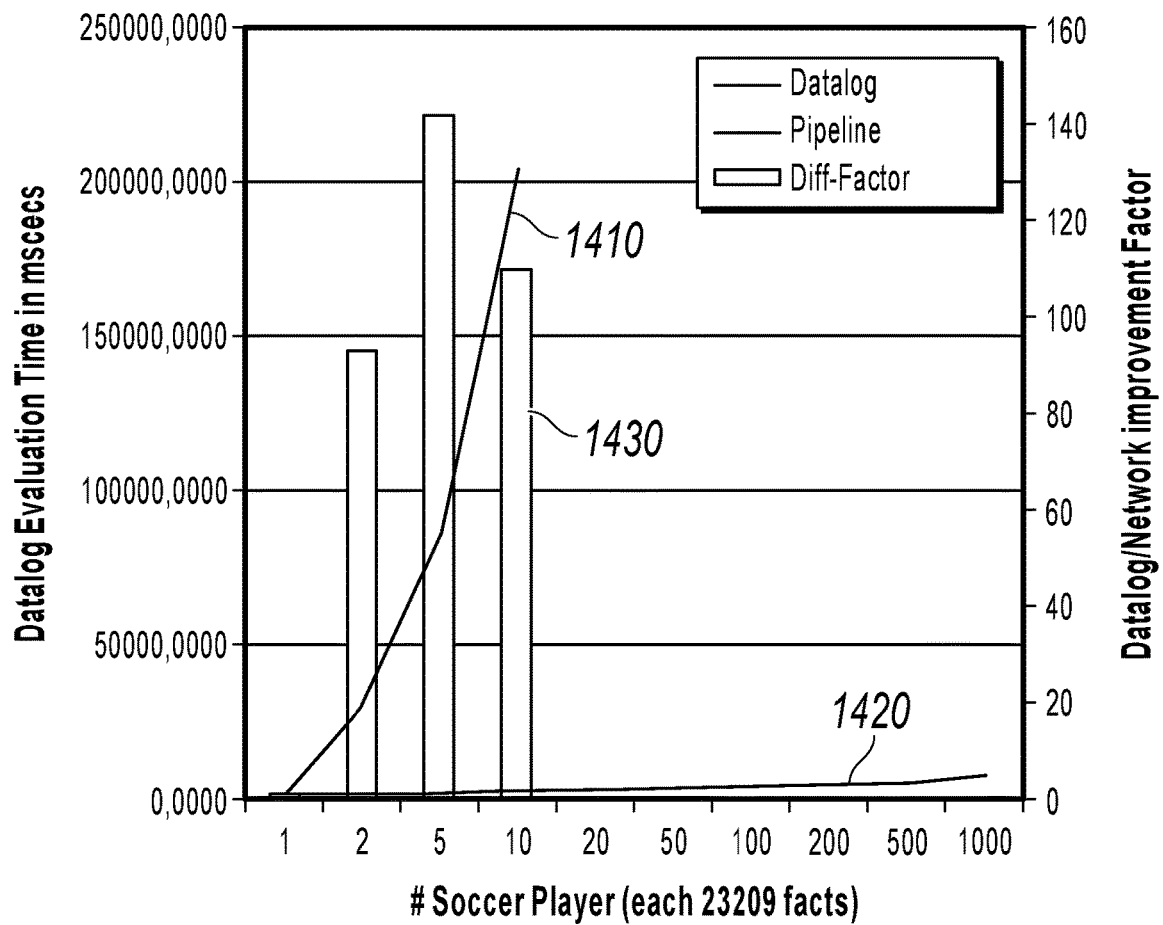
FIGS. 14 and 15 are plots showing performance measurements of standard DATALOG program of FIG. 10 and DATALOG pipeline of FIG. 13 according to an implementation.
Figure 15:
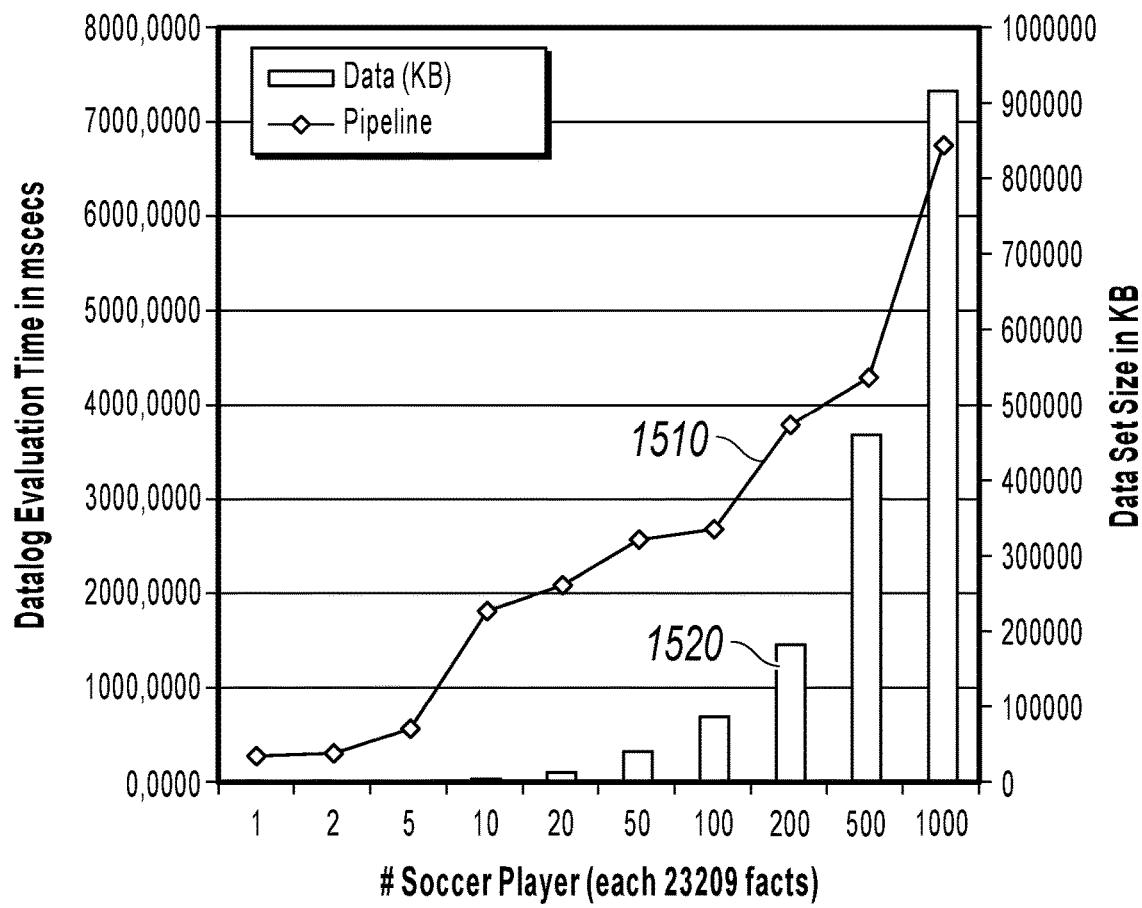

FIGS. 14 and 15 are plots 1400 and 1500 showing performance measurements of the standard DATALOG program of FIG. 10 and DATALOG pipeline of FIG. 13 according to an implementation. The measurements are performed on the data set for an increasing number of soccer players (from 1 player up to 1000 players). Since only 36 players actively participated in the match and not all players were allowed to play the complete 90 minutes of the match, the players' data of those playing the whole match were scaled up to 1000 player trajectory data sets. Accordingly, each player trajectory for one period contains 23209 position facts, while each heat map computing (heatmap-rules) is based on the evaluation of 7140 disjoint rules and one union (union-rules).

FIG. 14 shows the required runtime in milliseconds for the DATALOG (curve 1410) and the DATALOG pipeline using ILP (curve 1420) as well as the performance factors between the two approaches as bar chart 1430. Loading all player trajectories into the DATALOG library at once and performing the heat map computation resulted in execution times that are higher by factors compared to DATALOG pipeline using ILP. When the measurements are above approximately 1.1 million facts (comparable to 50 MB), the used DATALOG library ran into Java OutOfMemory errors, thus no measurements could be conducted. For the DATALOG pipeline approach with ILP, on the other hand, heat maps for up to 1000 players with 23.21 billion position facts (comparable to 900 MB) could be computed below seven seconds in average with a CPU load of approximately 90%.

FIG. 15 shows the detailed measurements for a DATALOG pipeline using ILP. The curve 1510 shows the DATALOG evaluation time and the bar chart 1520 overlay denotes the data set size in KB. The computations showed that the heat map computation is rather CPU than memory bound.

The example experiment performed based on the "DEBS Grand Challenge" shows extended applications of performing integration logic programming by applying DATALOG into an integration system context for more expressive DATALOG processing (e.g., using DATALOG with EIPs).

The integration logic programming techniques described herein includes application of DATALOG to the integration middleware domain. Building-block language constructs (e.g., the example ILP patterns described with respect to Listings 1-8) of combined integration programming and DATALOG are defined. The language constructs are systematically synthesized to integration logic programs using the widely recognized EIPs. The language embedding and integration semantics are defined by the example of the open source integration system APACHE CAMEL, which has a broad coverage of EIPs and allows for extensible integration programming language constructs. With CAMEL-DATALOG expressions and $DL^+B$, integration logic can be expressed declaratively (e.g., no Java, C\# code required) and the message processing can be executed closer to its storage representation, while leveraging the full processing capabilities of the integration systems.

The composition of the language constructs or ILP patterns can lead to more complex integration scenarios that will not only allow for declarative integration programming, but for efficient relational data processing within standard middleware systems. For instance, the Scatter/Gather pattern is a composition of a splitter and an aggregator that can be used to implement map/reduce-style processing. The ILP patterns can be composed to configurable integration logic pipelines representing the foundation of a novel middleware system, which can be evaluated based on real-world scenarios (e.g., the example heat map experiment).

The integration logic programming techniques enable implementations of EIPs, the building blocks of a middleware system, using logic programs, and the extension of the ability to express standard DATALOG evaluation towards DATALOG with choice, map/reduce-style and sliding window, stream processing systems. The latter can be reached by interweaving, de-composing DATALOG programs with integration programming. The integration logic programming extends integration programming with declarative, relational logic programming for application integration as well as the expressiveness of logic programs through integration semantics.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving, by operation of a middleware system, first information in a first format corresponding to a first application, wherein the middleware system comprises a set of protocol adapters for receiving information corresponding to a plurality of applications through a plurality of protocols, the information being in a plurality of different formats;
converting the first information in the first format into converted first information with a canonical data model format;
applying, by operation of the middleware system, a plurality of integration logic programming (ILP) patterns to the converted first information, the plurality of ILP patterns representing application integration semantics using a logic programming language, wherein one of the plurality of ILP patterns comprises a message filter, configured to route the converted first information based on a set of facts within the converted first information;
generating, by operation of the middleware system, a reduced set of intermediate results as aggregated information in response to applying a first ILP pattern of the plurality of ILP patterns to the first information and a second ILP pattern of the plurality of ILP patterns to second information corresponding to a second application to generate the intermediate results, wherein the first application and the second application run on different systems and use different database solutions, computer languages, or data formats; and
outputting, by operation of the middleware system, the aggregated information in a target format corresponding to a target application.

2. The method of claim 1, wherein the first ILP pattern of the plurality of ILP patterns comprises DATALOG or PROLOG.

3. The method of claim 1, wherein one of the plurality of ILP patterns comprises a content filter configured to remove a portion of the converted first information before routing the converted first information.

4. The method of claim 1, comprising defining the plurality of ILP patterns by representing application integration semantics using the logic programming language.

5. The method of claim 1, wherein applying the first ILP pattern of the plurality of ILP patterns to the first information comprises applying a composited ILP pattern to allow extended logic programming processing, the composited ILP pattern comprises two or more ILP patterns.

6. The method of claim 1, wherein the first format is Extensible Markup Language (XML), JAVASCRIPT Object Notation (JSON), Java, or C#, and the canonical data model format is DATALOG, PROLOG, or Structured Query Language (SQL).

7. A non-transitory, computer-readable medium storing computer-readable instructions executable by a computer and configured to:

receive, by operation of a middleware system, first information in a first format corresponding to a first application, wherein the middleware system comprises a set of protocol adapters for receiving information corresponding to a plurality of applications through a plurality of protocols, the information being in a plurality of different formats;

convert the first information in the first format into converted first information with a canonical data model format;

apply a plurality of integration logic programming (ILP) patterns to the converted first information, the plurality of ILP patterns representing application integration semantics using a logic programming language, wherein one of the plurality of ILP patterns comprises a message filter, configured to route the converted first information based on a set of facts within the converted first information;

generate a reduced set of intermediate results as aggregated information in response to applying a first ILP pattern of the plurality of ILP patterns to the first information and a second ILP pattern of the plurality of ILP patterns to second information corresponding to a second application to generate the intermediate results, wherein the first application and the second application run on different systems and use different database solutions, computer languages, or data formats; and output the aggregated information in a target format corresponding to a target application.

8. The non-transitory, computer-readable medium of claim 7, wherein the first ILP pattern of the plurality of ILP patterns comprises DATALOG or PROLOG.

9. The non-transitory, computer-readable medium of claim 7, wherein one of the plurality of ILP patterns comprises a content filter configured to remove a portion of the converted first information before routing the converted first information.

10. The non-transitory, computer-readable medium of claim 7, comprising instructions to define the plurality of ILP patterns by representing application integration semantics using the logic programming language.

11. The non-transitory, computer-readable medium of claim 7, wherein applying the first ILP pattern of the plurality of ILP patterns to the first information comprises applying a composited ILP pattern to allow extended logic programming processing, the composited ILP pattern comprises two or more ILP patterns.

12. The non-transitory, computer-readable medium of claim 7, wherein the first format is Extensible Markup Language (XML), JAVASCRIPT Object Notation (JSON), Java, or C#, and the canonical data model format is DATALOG, PROLOG, or Structured Query Language (SQL).

13. A system, comprising:
a memory;
at least one hardware processor interoperably coupled with the memory and configured to:
receive, by operation of a middleware system, first information in a first format corresponding to a first application, wherein the middleware system comprises a set of protocol adapters for receiving information corresponding to a plurality of applications through a plurality of protocols, the information being in a plurality of different formats;

convert the first information in the first format into converted first information with a canonical data model format;

apply a plurality of integration logic programming (ILP) patterns to the converted first information, the plurality of ILP patterns representing application integration semantics using a logic programming language, wherein one of the plurality of ILP patterns comprises a message filter, configured to route the converted first information based on a set of facts within the converted first information;

generate a reduced set of intermediate results as aggregated information in response to applying a first ILP pattern of the plurality of ILP patterns to the first information and a second ILP pattern of the plurality of ILP patterns to second information corresponding to a second application to generate the intermediate results, wherein the first application and the second application run on different systems and use different database solutions, computer languages, or data formats; and output the aggregated information in a target format corresponding to a target application.

14. The system of claim 13, wherein the first ILP pattern of the plurality of ILP patterns comprises DATALOG or PROLOG.

15. The system of claim 13, wherein one of the plurality of ILP patterns comprises a content filter configured to remove a portion of the converted first information before routing the converted first information.

16. The system of claim 13, wherein applying the first ILP pattern of the plurality of ILP patterns to the first information comprises applying a composited ILP pattern to allow extended logic programming processing, the composited ILP pattern comprises two or more ILP patterns.

17. The system of claim 13, wherein the first format is Extensible Markup Language (XML), JAVASCRIPT Object Notation (JSON), Java, or C#, and the canonical data model format is DATALOG, PROLOG, or Structured Query Language (SQL).

* * * * *